Figure 1:
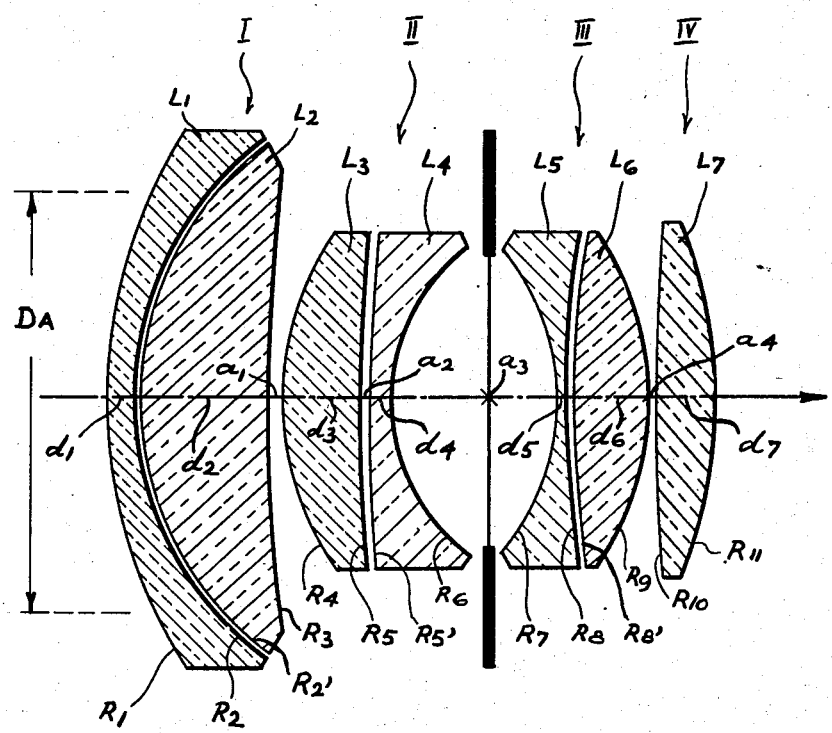

July 14, 1953  A. W. TRONNIER  2,645,155
PHOTOGRAPHIC OBJECTIVE OF HIGH LIGHT-TRANSMITTING
CAPACITY OF THE GAUSS TYPE
Filed Sept. 12, 1950  2 Sheets-Sheet 1

INVENTOR.
ALBRECHT WILHELM TRONNIER
BY Mock + Blum
ATTORNEYS.

INVENTOR.
ALBRECHT WILHELM TRONNIER
BY Mock + Blum
ATTORNEYS

Patented July 14, 1953

2,645,155

UNITED STATES PATENT OFFICE 2,645,155

PHOTOGRAPHIC OBJECTIVE OF HIGH LIGHT - TRANSMITTING CAPACITY OF THE GAUSS TYPE

Albrecht Wilhelm Tronnier, Gottingen, Germany, assignor to Voigtlander & Sohn Aktiengesellschaft, Braunschweig, Germany, a corporation of Germany Application September 12, 1950, Serial No. 184,454
In Switzerland January 16, 1950

4 Claims. (Cl. 88—57)

This invention relates to a photographic objective of the modified Gauss-type, distinguished by very high light-transmitting power and anastigmatic flatness of field, which includes two lens groups located on the opposite sides of an inner diaphragm. Such variations of the Gauss-type can be corrected spherically, chromatically and for coma with a simultaneously resulting anastigmatic image field flattening within a field of vision of 30° extension, even in the case of very large relative apertures.

One of the objects of the present invention is the extension of the lateral correction to a larger image field without other image defects being increased within the extended field in an objectionable manner.

Numerous other objects, advantages and features of this invention are set forth in the following description and the annexed drawings, which include an example of the invention, to which the invention is not limited.

In the drawing,

Figure 1 is a vertical axial section of the improved objective, taken along its optical axis. The horizontal optical axis is indicated by the horizontal arrow which also indicates the direction of the light, from left to right. The object space is at the left of the objective and the image space at the right of the objective.

Figure 2:
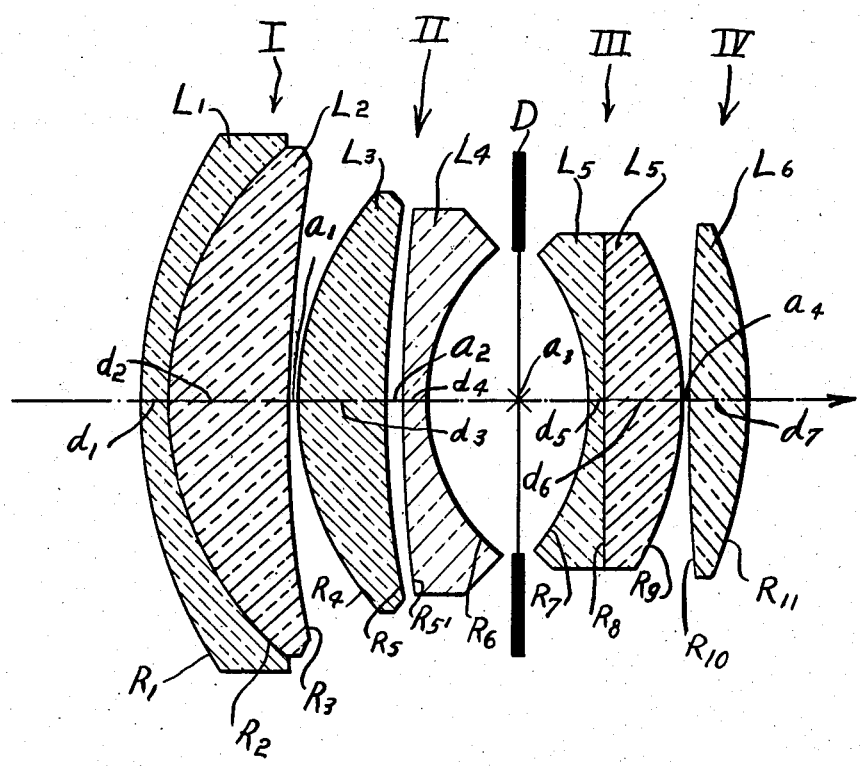

Figure 2 illustrates an embodiment of the invention at a focal length of f=150 mm. in actual size.

The improved photographic objective embodying the present invention includes two lens groups on each side of an intermediately located diaphragm and comprises the following elements arranged in the direction of light to the photographic image: (a) a front lens group consisting of two meniscus shaped individual lenses of opposite power, which are both concave relative to the diaphragm; the focal length of this front lens group is in the range of 1.3 F to 2.6 F, wherein F denotes the equivalent focal length of the total objective; (b) a second lens group consisting of two meniscus shaped individual lenses of opposite power; this second lens group has a focal length in the range of −2.50 F to −5.00 F; (c) an air space containing the intermediate diaphragm; (d) a third lens group consisting of two lenses of opposite power, i. e. a diverging front lens element and a converging rear lens element; this third lens group has a focal length in the range of −1.50 F to −3.50 F; (e) a single lens which forms the last lens element of the objective and has a focal length in the range of 0.55 to 0.95 F.

The radii of curvature of the individual refractive surfaces have the following values:

$$0.4\ F < R_1 < 0.9\ F$$
$$0.3\ F < R_2, R'_2 < 0.6\ F$$
$$0.6\ F < R_3 < 6.0 F$$
$$0.3\ F < R_4 < 0.6\ F$$
$$0.6\ F < R_5, R'_5 < 6.0\ F$$
$$0.15\ F < R_6 < 0.45\ F$$
$$0.2\ F < -R_7 < 0.5\ F$$
$$\tfrac{1}{2}\ F < \pm R_8, R'_8 < \infty$$
$$0.3\ F < -R_9 < 0.6\ F$$
$$\tfrac{1}{2}\ F < \pm R_{10} < \infty$$
$$0.4\ F < -R_{11} < 0.9\ F''$$

In the objectives of the present invention, the lateral correction is extended by new structural steps to a quite considerably larger image field without the other image defects or their zonal intermediate errors being increased within the extended field of vision in an objectionable manner.

In order to obtain this improved effect, the new objective of the invention, which is contemplated for relative apertures considerably higher than 1:1.6, is built in the following manner:

Of the two lens groups arranged on the two sides of the diaphragm, the lens group preceding the diaphragm on the side of the major conjugate and being the front member in the sense of the photographic picture, consists of a modification of a half-objective the Gauss-type, in which all individual elements are menisci. In this fundamental structure, according to my invention, each of the lens groups of the front member, which are located on the side of the major conjugate, is composed of two vicinal menisci of opposite power, all radii of curvature of which are concave relative to the diaphragm following them, i. e. the radii have a positive sign of direction, in conformity with the conventional definition of signs in geometrical optics, relative to the photographic object located on the side of the major conjugate.

It has been found that in the objectives of the invention the zonal intermediate aberrations of the image defects can be easily further reduced by the introduction of stronger asymmetries. This can be done in accordance with the present invention, by selecting the curvatures of the vicinal surfaces of the menisci of opposite power in each lens group of the front member as follows:

The curvature of these vicinal surfaces of one lens group should be distinctly stronger than the double of the curvature of the pair of vicinal surfaces of the other lens group of this front member. This ratio of curvatures should be referred, instead of the curvatures proper, to the respective mean values of curvature, whenever such a pair of vicinal surfaces has somewhat different radii, instead of equal radii, for example in view of the specific selection of glasses.

Said asymmetry of the design of the system results in particularly advantageous effects if, in accordance with the present invention, it is carried to an extent, at which the curvature or the corresponding mean value of curvature of one pair of vicinal surfaces is distinctly smaller than 80% of the diameter of the initial aperture of the total objective. It is to be understood that the term "initial aperture" is used to denote the diameter of the entrance aperture for rays of the system, which is defined by the quotient of the equivalent focal length of the system divided by the number of the relative initial aperture (which is identical with the maximum number of the relative aperture).

The strongest asymmetry in the distribution of curvatures within these pairs of vicinal surfaces can be attained by having the strongest curvature in the lens group of the greatest sectional aperture. In the objective according to the present invention, this is the lens group directly vicinal to the side of the major conjugate. This step according to the invention permits an extension of the effective image field to more than 50°, without the occurrence of increased zonal intermediate errors in said large image angle range.

Investigations made in connection with the present invention have also shown, that, in the case of relative apertures of 1:1.5, within the extended image field even a reduction of the apertural intermediate errors in the new objectives can be attained under the following conditions:

The curvatures of the two lens groups located on the side of the major conjugate, which together form the front member preceding the diaphragm, are selected in such a manner that, on the one hand, the sum of the two outer radii of this front member, i. e. the sum of (a) the front radius of the total objective, which is turned directly to the major conjugate and is convex relative to the latter and (b) the inner radius of said front member, which is adjacent the diaphragm and concave relative to the latter and is the "last" radius of the front member in the sense of the photographic picture, is distinctly greater than 80% of the diameter of the initial aperture of the total objective, but not greater than 180% of this diameter, while, on the other hand, the difference of the lengths of radii of these two outer surfaces of the front member is distinctly smaller than 80% of the diameter of said initial aperture of the total system.

Moreover, according to the present invention the apertural error in the tangential bundles (meridional coma) can be additionally reduced for ranges of medium inclination of rays within the attained large image field.

This can be done by having also in the rear member, which follows the diaphragm in the sense of the photographic picture, a distribution of curvatures similar to that described above in connection with the front member. This means that the sum of absolute values of the two outer radii of this rear member, i. e. the sum of (a) the front radius of the rear member, which is adjacent the diaphragm and is concave relative to the latter, and (b) the outer radius of the total objective, which limits said rear member on the side of the minor conjugate and is likewise concave relative to the diaphragm, should be distinctly greater than 80% of the diameter of the initial aperture of the total system, without, however, being greater than 180% of this diameter of said aperture, and, simultaneously and in addition to that, the difference of absolute lengths of radii of these two outer radii of the rear member should be distinctly smaller than 80% of the diameter of the initial aperture of the total objective. In this case too, the numerical value of this initial aperture is defined by the quotient of the equivalent focal length divided by the initial number of the (maximum) relative aperture of the system.

Referring now in detail to the drawings, Figure 1 is a sectional illustration of the objective according to the present invention and includes various reference symbols. In this figure, I and II denote the two lens groups located on the side of the major conjugate; the diaphragm is denoted by B and the rear members, arranged on the other side of the diaphragm, are denoted III and IV. The lenses are denoted $L_1$, $L_2$, $L_3$, $L_4$, $L_5$, $L_6$ and $L_7$. The radii of curvature of the vicinal surfaces between the menisci of opposite power in lens groups I and II of the front member are denoted $R_2$ and $R'_2$, and $R_5$ and $R'_5$, respectively. $R_1$, $R_3$, $R_4$, $R_6$, $R_7$, $R_8$, $R'_8$, $R_9$, $R_{10}$ and $R_{11}$ denote the radii of curvature of the other lens surfaces. $d_1$, $d_2$, $d_3$, $d_4$, $d_5$, $d_6$, and $d_7$ denote the thickness of the lenses; $a_1$ denotes the distance between lenses $L_2$ and $L_3$, $a_2$ the distance between lenses $L_3$ and $L_4$, $a_3$ the distance between lenses $L_4$ and $L_5$, and $a_4$ the distance between lenses $L_6$ and $L_7$. $D_A$ denotes the diameter of the initial front aperture. The values of $d_1$ to $d_7$ and $a_1$ to $a_4$ are measured on the horizontal optical axis.

In the following table, the refraction indices $n$ of the glasses used are denoted by consecutive numbers starting on the side of the longer conjugate and proceeding to the side of the shorter conjugate. In accordance with Figure 1, the before-mentioned outer radii of the front member are denoted $R_1$ and $R_6$ and those of the rear member $R_7$ and $R_{11}$.

Figure 2, which illustrates an embodiment of the invention in the case of a focal length f=150 mm. in actual size, corresponds in its structure to the example illustrated in the following table, in which example the focal length is assumed to be equal to 1.00. Accordingly, all radii, thicknesses and distances refer to this unit. The glasses used are characterized by their mean refraction index $n_d$ for the yellow helium light, while their mean color dispersion is characterized by the Abbé number $\nu$. The diameter of the initial aperture of the example amounts to 0.70 units for the total objective of the focal length of 1, corresponding to a relative aperture of about 1:1.4 of the system.

The focal lengths of lens groups or elements I, II, III, IV are about as follows:

I. $f_{1_2} = +1.844$
II. $f_{3_4} = -3.870$
III. $f_{5_6} = -2.484$
IV. $f_7 = +0.761$

Numerical example

[$f = 100$   Diameter of aperture = 0.70]

| | | | |
|---|---|---|---|
| $R_1 = +0.68359$ | $d_1 = 0.03539$ | $n_1 = 1.72713$ | $\nu_1 = 28.4$ |
| $R_2 = R'_2 = +0.42566$ | $d_2 = 0.16176$ | $n_2 = 1.61966$ | $\nu_2 = 55.0$ |
| $R_3 = +2.02423$ | $a_1 = 0.00289$ | air | |
| $R_4 = +0.42566$ | $d_3 = 0.12118$ | $n_3 = 1.70329$ | $\nu_3 = 41.1$ |
| $R_5 = +1.64339$ | $a_2 = 0.01596$ | air | |
| $R'_5 = +2.02423$ | $d_4 = 0.03443$ | $n_4 = 1.54826$ | $\nu_4 = 45.8$ |
| $R_6 = +0.25716$ | $a_3 = 0.21293$ | air diaphragm space | |
| $R_7 = -0.30927$ | $d_5 = 0.02058$ | $n_5 = 1.64819$ | $\nu_5 = 33.7$ |
| $R_8 = R'_8 = $ infinity | $d_6 = 0.10598$ | $n_6 = 1.61959$ | $\nu_6 = 60.5$ |
| $R_9 = -0.42566$ | $a_4 = 0.00385$ | air | |
| $R_{10} = +2.96383$ | $d_7 = 0.07655$ | $n_7 = 1.69347$ | $\nu_7 = 53.5$ |
| $R_{11} = -0.63533$ | | | |

Thus:

$$D_A = 0.70$$

and $$80\% \ D_A = 0.560$$
$$180\% \ D_A = 1.260$$

From the above it follows:

(a) $\quad R_2 = R'_2 = 0.42566$

This figure is distinctly smaller than (80% of 0.70) i.e. 0.560.

(b) $\quad R_5 = 1.64339$
$\quad R'_5 = 2.02423$
$\quad R_5 + R'_5 = 3.66762$ and thus $$\frac{R_5 + R'_5}{2} = 1.83381$$

i. e. the mean value of curvature.

This figure 1.83381 is distinctly greater than the double of 0.42566.

(c) $\quad R_1 = 0.68359$
$\quad R_6 = 0.25716$
$\quad R_1 + R_6 = 0.94075$

This sum is greater than 0.560, but smaller than 1.260.

(d) $\quad R_1 - R_6 = 0.42643$

This difference is distinctly smaller than 0.560.

(e) $\quad R_{11} = 0.63533$ abs.
$\quad R_7 = 0.30927$ abs.
$\quad R_{11} + R_7 = 0.94460$ This sum is greater than 0.560 but smaller than 1.260.

(f) $\quad R_{11} - R_7 = 0.32606$

This difference is distinctly smaller than 0.560.

The focal length of lens group I is in the range of 1.30 F to 2.60 F; the focal length of lens group II in the range of −2.50 F to −5.00 F; the focal length of lens group III in the range of −1.50 F and −3.50 F and the focal length of lens $L_7$ in the range of 0.55 F to 0.95, wherein F denotes the equivalent focal length of the total objective.

A preferred embodiment of this invention has been described, but numerous changes, omissions, additions and substitutions can be made without departing from its scope.

As will be seen from the drawings, in the embodiment shown in Figure 1 there is an air-space between lenses $L_1$ and $L_2$ and lenses $L_5$ and $L_6$, while in the embodiment shown in Fig. 2 the lens elements corresponding to $L_1$ and $L_2$ and those corresponding to $L_5$ and $L_6$ are cemented together. Both of these embodiments can be used in carrying out the present invention. The radii $R_2$ and $R'_2$ may have identical values and, likewise and independently, radii $R_8$ and $R'_8$ may also be equal, as shown in Fig. 2 and in the numerical example; in this latter case the beforementioned lens elements are cemented together. However, it is also possible that radii $R_2$ and $R'_2$ and/or radii $R_8$ and $R'_8$ show a slight difference and in such a case, as shown in Figure 1, $L_1$ and $L_2$ and $L_5$ and $L_6$ are not cemented together. Furthermore, the value of radii $R_8$ and $R'_8$ in Figure 2 is infinite, while the corresponding radii in Figure 1 have a positive value. Such variations can be made substantially without affecting the results obtained by the present invention.

What is claimed is:

1. Photographic objective of high light-transmitting capacity and anastigmatic flattening of the image field, of the modified Gauss type, which includes two lens groups on each side of an intermediately located diaphragm and comprises the following elements arranged in the direction of light to the photographic image: (a) a front lens group consisting of two meniscus shaped individual lenses of opposite power, which are both concave relative to the diaphragm, the focal length of this front lens group being in the range of 1.3 F to 2.6 F, wherein F denotes the equivalent focal length of the total objective; (b) a second lens group consisting of two meniscus shaped individual lenses of opposite power, said second lens group having a focal length in the range of −2.50 F to −5.00 F; (c) an air space containing the intermediate diaphragm; (d) a third lens group consisting of two lenses of opposite power, i. e. a diverging front lens element and a converging rear lens element; said third lens group having a focal length in the range of −1.50 F to −3.50 F; (e) a single lens which forms the last lens element of the objective and has a focal length in the range of 0.55 to 0.95 F.

2. Photographic objective of high light-transmitting capacity and anastigmatic flattening of the image field, of the modified Gauss type, which includes two lens groups on each side of an intermediately located diaphragm and comprises the following elements arranged in the direction of light to the photographic image: (a) a front lens group consisting of two meniscus shaped individual lenses of opposite power, which are both concave relative to the diaphragm, the focal length of this front lens group being in the range of 1.3 F to 2.6 F, wherein F denotes the equivalent focal length of the total objective; (b) a second lens group consisting of two meniscus shaped individual lenses of opposite power, said second lens group having a focal length in the range of −2.50 F to −5.00 F; (c) an air space containing the intermediate diaphragm; (d) a third lens group consisting of two lenses of opposite power, i. e. a diverging front lens element and a converging rear lens element; said third lens group having a focal length in the range of −1.50 F to −3.50 F; (e) a single lens which forms the last lens element of the objective and has a focal length in the range of 0.55 to 0.95 F; the radii of curvature of the individual refractive surfaces having the following values:

$$0.4\ F < R_1 < 0.9\ F$$
$$0.3\ F < R_2, R'_2 < 0.6\ F$$
$$0.6\ F < R_3 < 6.0\ F$$
$$0.3\ F < R_4 < 0.6\ F$$
$$0.6\ F < R_5, R'_5 < 6.0\ F$$
$$0.15\ F < R_6 < 0.45\ F$$
$$0.2\ F < -R_7 < 0.5\ F$$
$$\tfrac{1}{2}\ F < \pm R_8, R'_8 < \infty$$
$$0.3\ F < -R_9 < 0.6\ F$$
$$\tfrac{1}{2}\ F < \pm R_{10} < \infty$$
$$0.4\ F < -R_{11} < 0.9\ F$$

wherein F stands for the equivalent focal length of the total objective and $R_1$, $R_2$, $R'_2$, $R_3$, $R_4$, $R_5$, $R'_5$, $R_6$, $R_7$, $R_8$, $R'_8$, $R_9$, $R_{10}$ and $R_{11}$ are the radii of curvature of individual lens surfaces within the objective consecutively numbered in the direction of light to the photographic image.

3. Photographic objective of high light-transmitting capacity and anastigmatic flattening of the image field, of the modified Gauss type, which includes two lens groups on each side of an intermediately located diaphragm and comprises the following elements arranged in the direction of light to the photographic image: (a) a front lens group consisting of two meniscus shaped individual lenses of opposite power, which are both concave relative to the diaphragm, the focal length of this front lens group amounting to about +1.844 F; (b) a second lens group consisting of two meniscus shaped individual lenses of opposite power, said second lens group having a focal length amounting to about −3.870 F; (c) an air space containing the intermediate diaphragm; (d) a third lens group consisting of two lenses of a diverging front lens element and a converging rear lens element; said third lens group having a focal length amounting to about −2.484 F; (e) a single lens which forms the last lens element of the objective and has a focal length amounting to about +0.761 F, wherein F stands for the equivalent focal length of the total objective.

4. Photographic objective of high light-transmitting capacity and anastigmatic flattening of the image field, of the modified Gauss type, which includes two lens groups on each side of an intermediately located diaphragm and comprises the following elements arranged in the direction of light to the photographic image: (a) a front lens group consisting of two miniscus shaped individual lenses of opposite power, which are both concave relative to the diaphragm, the focal length of this front lens group amounting to about +1.844 F; (b) a second lens group consisting of two meniscus shaped individual lenses of opposite power, said second lens group having a focal length amounting to about −3.870 F; (c) an air space containing the intermediate diaphragm; (d) a third lens group consisting of two lenses of opposite power, i. e. a diverging front lens element and a convergent rear lens element; said third lens group having a focal length amounting to about −2.484 F; (e) a single lens which forms the last lens element of the objective and has a focal length amounting to about +0.761 F; the radii of curvature of the individual refractive surfaces having the following values:

$$0.4\ F < R_1 < 0.9\ F$$
$$0.3\ F < R_2, R'_2 < 0.6\ F$$
$$0.6\ F < R_3 < 6.0\ F$$
$$0.3\ F < R_4 < 0.6\ F$$
$$0.6\ F < R_5, R'_5 < 6.0\ F$$
$$0.15\ F < R_6 < 0.45\ F$$
$$0.2\ F < -R_7 < 0.5\ F$$
$$\tfrac{1}{2}\ F < \pm R_8, R'_8 < \infty$$
$$0.3\ F < -R_9 < 0.6\ F$$
$$\tfrac{1}{2}\ F < \pm R_{10} < \infty$$
$$0.4\ F < -R_{11} < 0.9\ F$$

wherein F stands for the equivalent focal length of the total objective and $R_1$, $R_2$, $R'_2$, $R_3$, $R_4$, $R_5$, $R'_5$, $R_6$, $R_7$, $R_8$, $R'_8$, $R_9$, $R_{10}$ and $R_{11}$ are the radii of curvature of individual lens surfaces within the objective consecutively numbered in the direction of light to the photographic image.

ALBRECHT WILHELM TRONNIER.

References Cited in the file of this patent

UNITED STATES PATENTS

| Number | Name | Date |
|---|---|---|
| 1,899,934 | Berek | Mar. 7, 1933 |
| 2,164,028 | Berek | June 27, 1939 |
| 2,171,641 | Berek | Sept. 5, 1939 |

FOREIGN PATENTS

| Number | Country | Date |
|---|---|---|
| 428,657 | Germany | May 10, 1926 |
| 665,520 | Germany | Sept. 27, 1938 |